Feb. 14, 1956     R. O. MARSH, JR     2,734,476
BELT CONNECTED ROLLER ARRANGEMENTS FOR FORMING
VEHICLE TRACKS AND OTHER PURPOSES
Filed April 14, 1952     4 Sheets-Sheet 1
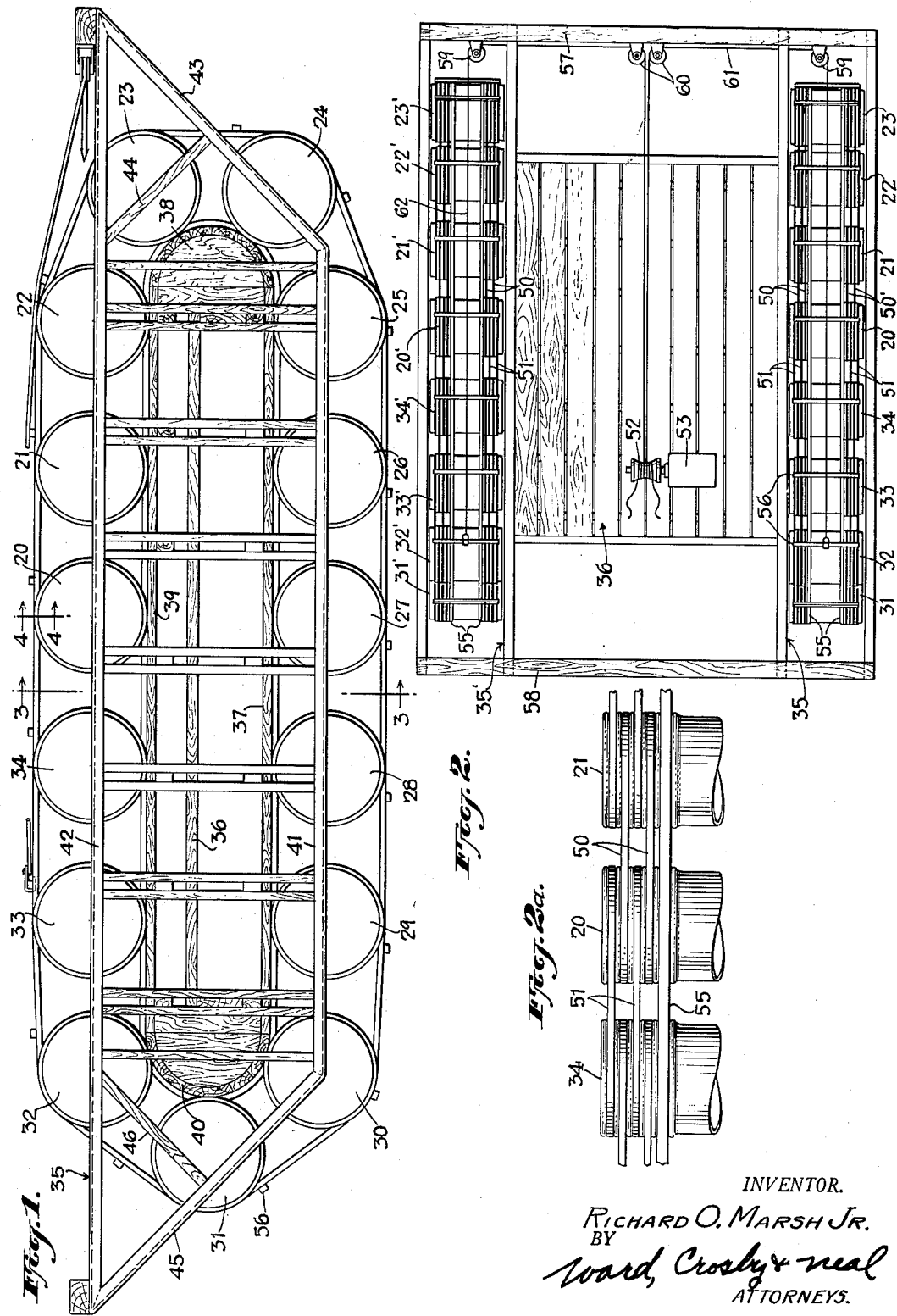
INVENTOR.
RICHARD O. MARSH JR.
BY
Ward, Crosby & Neal
ATTORNEYS.

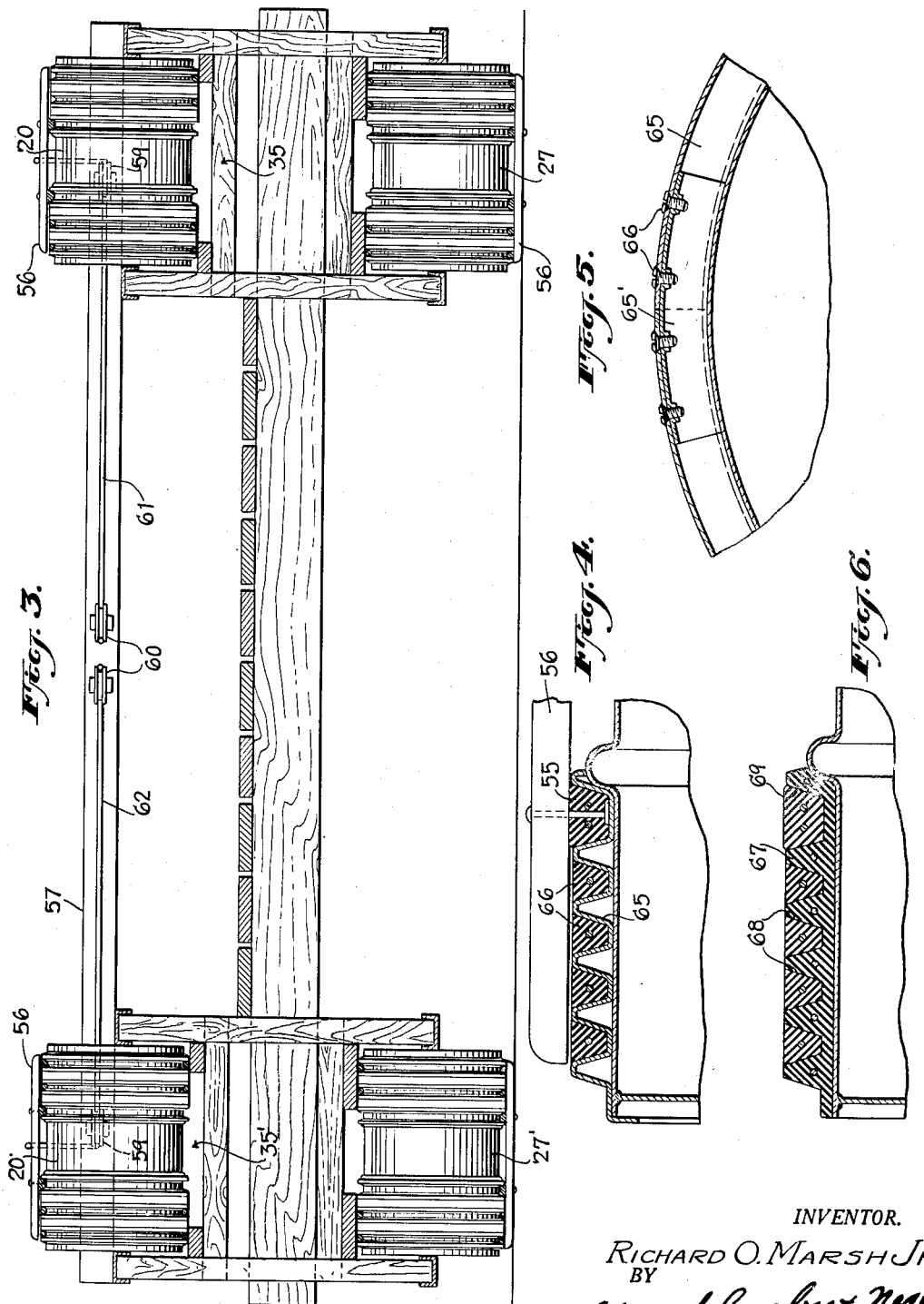

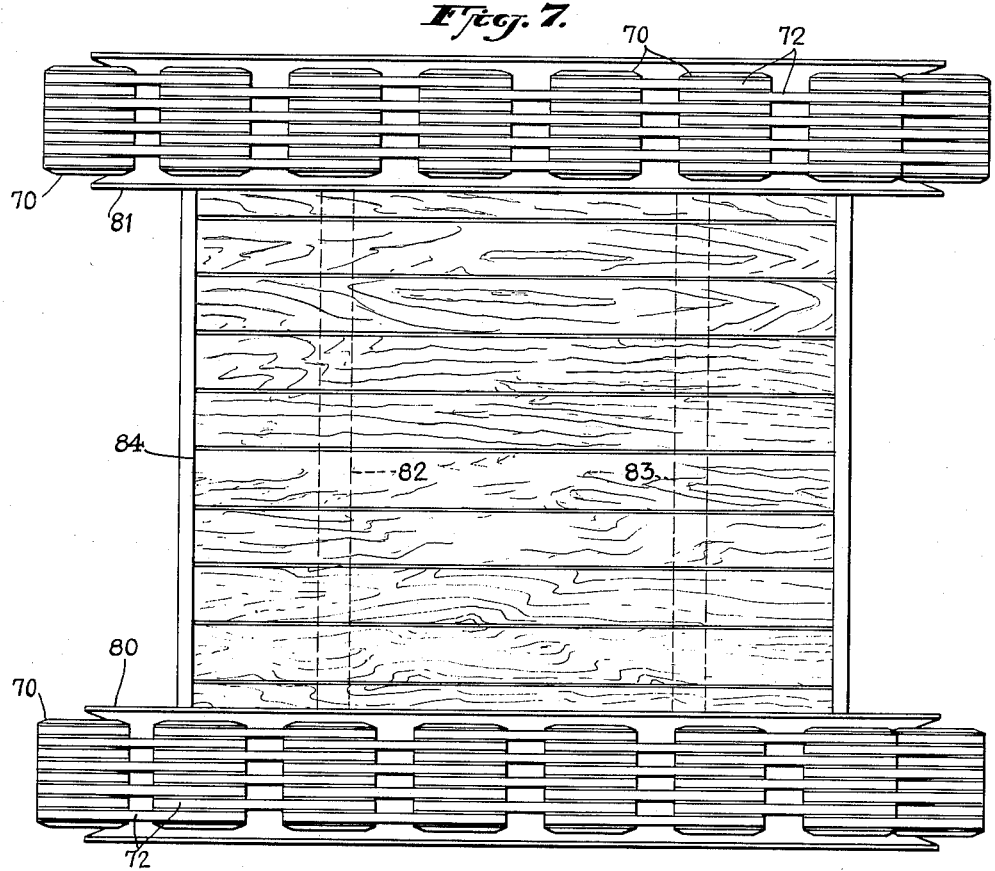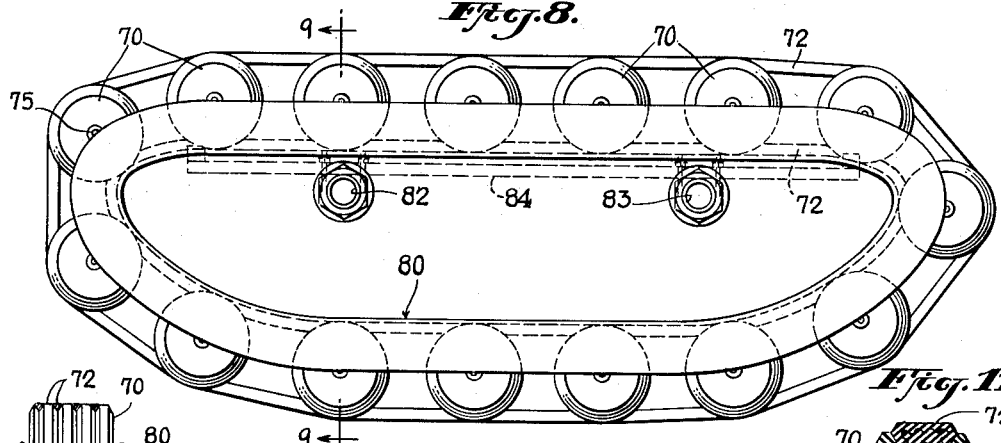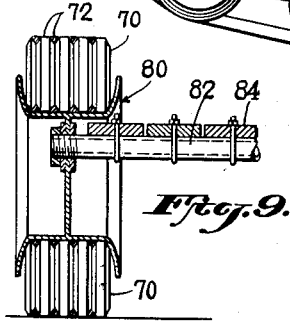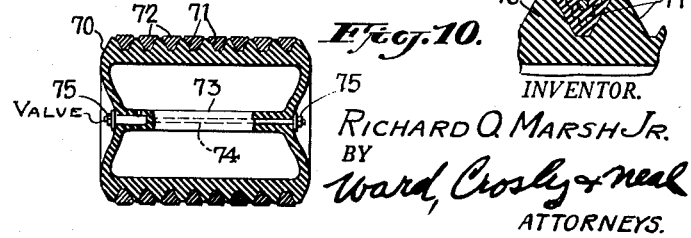

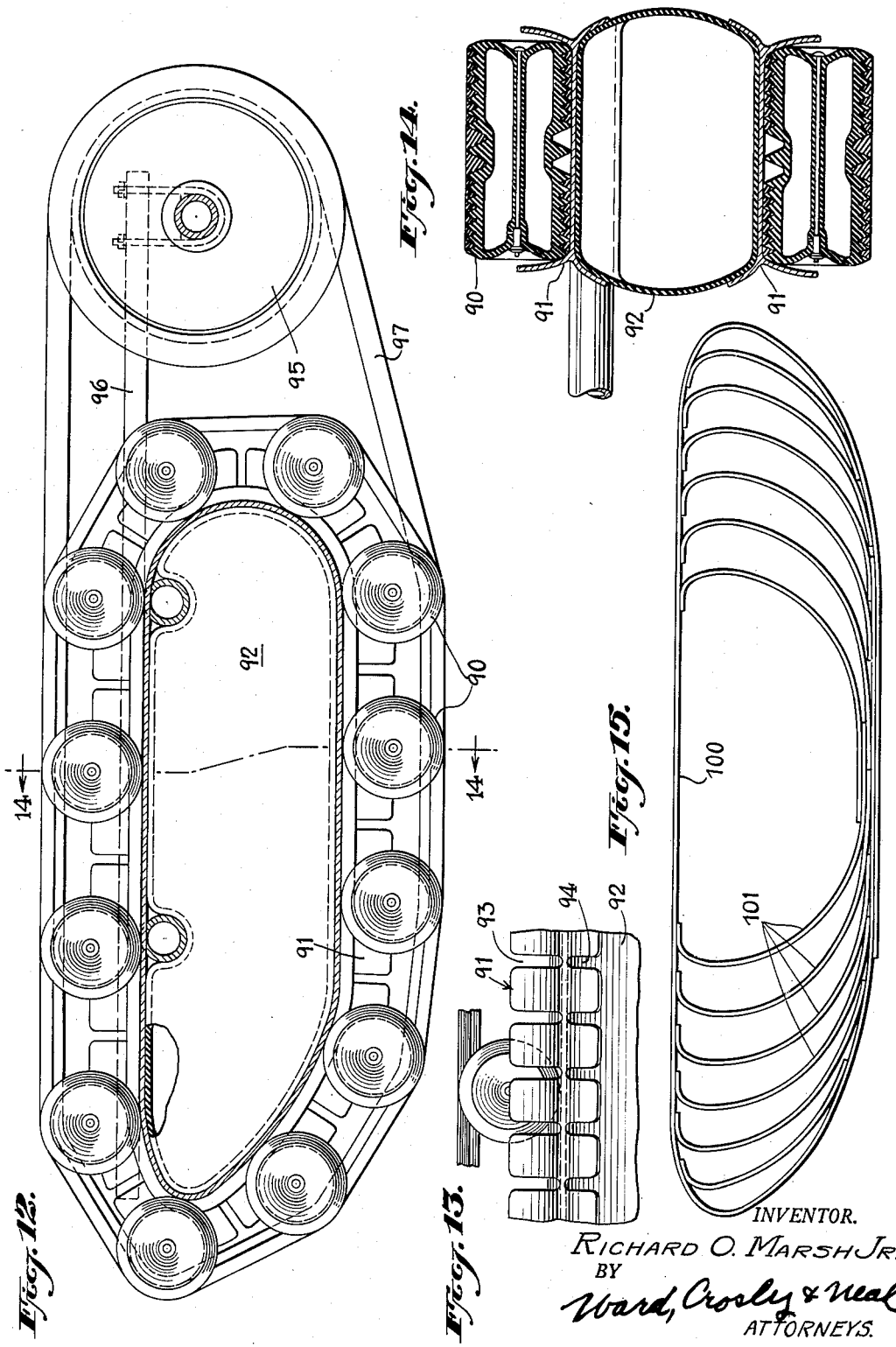

United States Patent Office 2,734,476
Patented Feb. 14, 1956

2,734,476
BELT CONNECTED ROLLER ARRANGEMENTS FOR FORMING VEHICLE TRACKS AND OTHER PURPOSES

Richard O. Marsh, Jr., Baltimore, Md.

Application April 14, 1952, Serial No. 282,238

11 Claims. (Cl. 115—1)

This invention relates to a novel arrangement of rollers, drums or the like connected by belts to roll in spaced-apart positions as an endless series about a frame or body means, in such a way that the arrangement may be used as an amphibious vehicle and for various other purposes hereinafter described.

With the preferred embodiment of the invention, a frame structure is surrounded by a continuous track means in the form of a series of spaced-apart drums or rollers, each of which is belted to a preceding drum or roller, and also separately belted to a succeeding drum or roller of the series, in such manner that each drum or roller is free to roll about the frame structure, the belts, if desired, also providing tread means for the assembly.

The invention provides an arrangement which has proven to be a highly desirable means for movably supporting platforms, vehicle frames and the like over bogs, marshes or submerged areas where the usual form of wheeled vehicles would be inoperative, or where there is insufficient water to permit use of a boat-like structure.

Heretofore, it has often been proposed to provide vehicle body or frame structures with endless tread arrangements comprising a continuous series of spaced-apart rollers interconnected to form an endless track about the frame or body or a portion thereof. But so far as I am aware, with all such prior arrangements it was the practice to provide each roller with an axle or the like, and to connect the axle for each roller to the axles for the preceding and succeeding rollers by linkage means of various types. Such arrangements, however, involved the necessity of providing bearings on the axles for each roller, and other relatively expensive, special and carefully shaped or machined parts which easily became injured or jammed when subjected to rough usage.

On the other hand, with the present invention the rollers may take the form of ordinary steel drums for example, or in some cases the rollers may take the form of flexible inflatable drums. No axles or bearings therefor are required, since the rollers are held in the desired spaced positions simply by the use of pluralities of belts so arranged as to permit the rollers individually to roll freely along a guideway surrounding the body or frame of the structure, while still being held spaced apart and with the belts acting to cause the whole series of rollers to be retained in position embracing the frame or structure. That is, each roller, and preferably the next roller in advance thereof, are embraced by a plurality of endless belts, and also another plurality of belts embraces the first roller and also the next succeeding roller. Thus the belts which extend rearwardly from each roller, act to tension the belts which extend forwardly from that roller and conversely, the belts which extend forwardly act to tension the belts which extend rearwardly from the same roller, thereby retaining the desired spacing of the rollers while still permitting each of same freely to roll about its own axis. Ordinarily, V-type belting such as readily available for driving machinery, may be used, or, if preferred, flat types of belting may be used particularly in cases where it is desired to provide a track means having an extensive surface area for engagement with soft earth or mud.

The invention provides a construction well adapted for use in providing an endless tread for tractors and trailers suitable both for highway and cross-country travel, and suitable for earth-moving equipment, amphibious trailers and tractors, airplane landing gear, or mobile gun mounts, etc. Units made according to the invention may also be used to form pontoon bridges, or may be used as land rollers. When the rollers are in the form of drums, the belted arrangement thereof on a frame is such that same may, for example, be thrown overboard from a ship, then floated to the shore and conveniently rolled up over the beach. Thus, if the drums are filled with material having a specific gravity substantially less than that of the water, the arrangement provides a convenient way for landing the filled drums in groups during military operations or in places where docks are unavailable.

Further and more specific objects, features and advantages of the invention will appear from the following detailed specification, taken in connection with the appended drawings which form a part of this specification and illustrate, by way of example, various preferred forms of the invention.

In the drawings:

Figs. 1 and 2, respectively, are side elevation and plan views of one embodiment of the invention utilizing rollers in the form of steel drums.

Fig. 2a is a somewhat schematic enlarged view illustrating the manner in which the rollers are belted together.

Fig. 3 is a sectional view taken substantially along the line 3—3 of Fig. 1.

Fig. 4 is a sectional view taken at line 4—4 of Fig. 1 and showing certain details.

Fig. 5 is a sectional view taken at right angles to the view of Fig. 4.

Fig. 6 is a view similar to Fig. 4, showing an alternative construction.

Figs. 7 and 8 are plan and side elevational views, respectively, of an alternative embodiment of the invention using rollers in the form of drums which may be inflated.

Fig. 9 is a sectional view taken along line 9—9 of Fig. 8.

Fig. 10 is a sectional view showing one of the drums such as may be used in the embodiment of Figs. 7–9.

Fig. 11 is an enlarged sectional view of a grooved wall portion of the drum of Fig. 10, showing a V-belt in section as applied thereto.

Fig. 12 is a side elevational view of an alternative embodiment of the invention utilizing an inflatable body portion.

Fig. 13 is a view showing certain details of the roller guide means of the embodiment of Fig. 12.

Fig. 14 is a sectional view taken along line 14—14 of Fig. 12; and

Fig. 15 is a side elevational view of a body portion formed of spring strip members and which may be used with various forms of the invention.

Referring now to Figs. 1–3, inclusive, in further detail, for the form of the invention here shown, the rollers as at 20–34, inclusive, may comprise ordinary steel drums, for example, 55-gallon drums or barrels, as commonly used for oil. One continuous series of the spaced-apart drums is arranged about a guideway or frame means 35, along one side of a platform 36, and another series of the drums as at 20'–34', is arranged around in a similar guideway 35' at the other side of the platform 36.

As shown in Fig. 1, each drum guideway may comprise a lower straight flat portion 37 extending along the under side of the structure and continued forwardly, upwardly and around as an arcuate portion 38, joining an upper straight portion 39. The latter portion continues rearwardly, then downwardly and around arcuately at 40 to join the lower portion 37.

Side frame means may be provided at each side of each guideway by the use of angle irons or strips, as indicated at 41–46, inclusive, these being so positioned as to allow the drums to roll freely, but if same should tend to move endwise out of proper position, the drum ends or edges will be engaged and retained properly in the guideways therefor.

The platform 36 may be secured to and mounted upon the guideway frames in any suitable way, and serves to interconnect the guideway means at one side with the guideway means at the other side of the assembly.

The drums are belted together in the following described way. For example, starting with the drum 20 (Figs. 1, 2, 2a), a plurality of endless belts as at 50, are arranged to engage and embrace about 180° of the rearward surface near one end of the drum 20. The same belts engage and embrace about 180° of the forward surface of the next drum 21. Similarly, another plurality of belts 51 alternating in positions laterally with the belts 50, embrace about 180° of the forward surface of drum 20, and also of the rearward surface of the drum 34. The other end portions of the drums 20, 21 and 34 are engaged by belts 50', 51', in a manner like the arrangement of belts 50, 51, respectively (see Fig. 2).

In a like way, each of the series of drums is, as will now readily be understood, belted to a preceding drum (preferably the next preceding drum, although not necessarily so) and separately belted to a succeeding drum of the series.

While the spacing of the drums as compared with the diameters thereof, is not critical in the usual case, it will be found desirable that such spacing be equal to about one-half the diameter of the drums. The form and degree of the curvature of the end portions as at 38 and 40 of the guideways, is also not critical, but generally it will be found desirable that these curved portions have a radius at least equal to the radius of the drums.

From inspection of Figure 1, it will be observed that as the drums roll around the curved guideway portions 38, 40, the spacings of the axes thereof will necessarily vary somewhat, particularly if the guideway portions are such as to rub against the inner stretches of the belts and tend to curve such stretches outwardly. Substantial changes in the spacings of the drums may also arise if the curvatures of the end portions of the guideways are of irregular shapes, such as shown in Figs. 8 and 12. Normally it will be desired to maintain all of the above-described belts under substantially uniform tension so that the whole belted series of rolls will embrace the guideway portion of the frame structure with sufficient firmness to retain the series in place without additional retaining means. Hence to avoid loosening of the belts as the result of changes in the spacings of the drums as they pass around the end curves, such changes in spacings may in practice be compensated for in the following way. That is, as shown in Fig. 1, the number of drums and the relative sizes and spacings thereof are such that, as each drum (as at 31 for example) rolls over the most rearwardly curved portion of the guideway, the most forwardly curved guideway portion at 38 will extend into a space between two adjacent drums (as at 23, 24). By this expedient, the tendency of the belts periodically to slacken at one end of the arrangement will, for practical purposes, be adequately overcome by the simultaneous tendency for the belts to become more tensioned at the other end of the arrangement and whereby the series of belts as a whole will be maintained nearly in uniform tension, despite the minor changes in spacings of the drums as they roll over the curved guideway portions.

It will be apparent that an arrangement such as above described may be formed from ordinary commercially available steel drums, strips of wood or metal and belting material of types all readily available at the sites of construction jobs. In making the entire arrangement, no castings, machined parts or skilled labor are required. With a construction such as shown in Figs. 1 and 2, formed with two groups of ordinary 55 gallon steel drums with fifteen drums in each group, the arrangement has been found to provide a satisfactory support on swamp land or marshes for a platform of more than 150 square feet in area and suitable for supporting earth-boring apparatus, for example, or other machinery. On firm ground, such arrangement can be readily pushed about by two men. To move the arrangement from time to time over swamp land, an anchor may be thrown out in advance thereof, connected to a cable or rope adapted to have tension applied thereto by winding about a pulley 52 or the like, driven by an engine at 53. However, a more convenient way of moving the arrangement is to provide belts embracing the whole of each series of rolls and with cleats thereon to which pulling cables may be applied. For example, as shown in Figs. 2, 2a, each group of drums may be entirely embraced by a pair of belts as at 55 interconnected by spaced apart transverse cleats or the like 56. The two sides of the vehicle may be interconnected at the forward and rear ends thereof as by beams 57, 58 on which may be mounted pulleys as at 59, 60. Cables as at 61, 62 may be detachably connected to the cleats and extend over these pulleys back to the motor-driven windup means 52 as shown. Thus when it is desired to advance the platform to a new position, the cleated belts are pulled by the above-described cable arrangement causing the drums to roll along and advance the assembly, for a distance about equal to its length. If further movement is required, the cables may of course be detached from the cleats and reconnected to cleats further back and then again pulled forward.

The drums may preferably be of types having end portions circumferentially corrugated to provide grooves adapted for firm frictional engagement with the belts, or, if preferred, as shown in Figs. 4 and 5, the end portions of each of the drums as at 20 may be encircled by sheet metal members as at 65 formed with grooves of suitable cross-sectional shape to receive the belts—in this case, as shown, V-type reinforced belts as at 55 and 66. The members 65 may, as shown in Fig. 5, be wrapped around the drums tightly and the ends thereof suitably secured as by a joint member 65' and screws 66 or otherwise.

If preferred, the end portions of the drums may be tightly embraced by resilient annular belt-like members as at 67 (Fig. 6) the external surface of which is formed with grooves as at 68, 69, for receiving the V-belts.

The embodiment of the invention shown in Figs. 7–11 inclusive, while generally similar to that above described, may have rollers as at 70 constructed in the form of inflatable hollow cylinders of rubber, artificial rubber or other flexible resilient material. As indicated in Fig. 10, each of these inflatable rollers may be formed on its exterior surface with circumferential grooves 71, for receiving V-belts as at 72 in Fig. 11. To retain the end portions of such a drum against bulging out endwise, they may be formed integrally with an axially positioned tubular connection as at 73 extending from the middle of one end of the drum to the middle of the other end, and containing a threaded rod as at 74 with washers and nuts threaded on its ends as at 75. At one end suitable valve means, as indicated, may be provided to permit inflation of the drum with air or other fluid.

With the form of the invention shown in Figs. 7–9, the sides or guideway portions of the structure as at 80, 81, may be formed of sheet metal. The parts, welded together, provide a cross-sectional shape such as indicated in Fig. 9, the structure at one side of the platform being connected to that at the other side as by tie rods or tubes 82, 83 which support the platform 84.

With the form of the invention shown in Figs. 12–14, inflatable rollers 90, generally similar to those of Fig. 10, are utilized, and each of the guideways comprises an endless flexible sheet metal member as at 91 of the cross-sectional shape shown in Fig. 14, and a side view of a portion of which is shown in Fig. 13. These members surround inflatable, flexible resilient rubber or the like body portions as at 92. The flange portions of the members 91 are formed at spaced intervals with notches as at 93, 94, so that when the rollers encounter hummocks or other obstructions and become pushed up out of place, the members 91 will bend against the resistance provided by inflatable bodies 92, but the inflatable bodies 92 will normally hold the members 91 to the general oval shape shown.

As further shown in Fig. 12, a drive pulley 95 may be rotatably mounted upon a bar or the like 96 extending out from the platform, this pulley being adapted to receive one or more belts as at 97 which extend around and engage all of the rollers. The pulley 95 may be driven by any suitable power means, and thus provide means for either continuously or intermittently advancing the whole structure. The inflatable members, such as at 92, as well as the inflatable type rollers will, of course, effectively provide buoyancy for the equipment when used on submerged and partially submerged land. Also, upon deflating these members, the equipment may easily be taken apart and more compactly stored.

Fig. 15 somewhat schematically shows a structure made of springy steel strips which may be substituted for inflatable members 92 in the arrangement of Fig. 12. That is, this may comprise a continuous flattened hoop-like member 100 formed of flat spring steel strip and having a plurality of curved spring members as at 101, also of flat steel strip and welded in positions as shown, to provide a highly resilient and yet durable support to be embraced by the endless roller track means.

Although certain particular embodiments of the invention are herein disclosed for purposes of explanation, various further modifications thereof, after study of this specification, will be apparent to those skilled in the art to which the invention pertains. Reference should accordingly be had to the appended claims in determining the scope of the invention.

What is claimed and desired to be secured by Letters Patent is:

1. The combination comprising a frame structure, a series of spaced-apart rollers arranged with substantially parallel axes to roll along the lower side of said structure, up around an end thereof, thence along the upper side thereof and down around the other end to the lower side of the structure again, and a plurality of continuous belts for retaining said series of rollers in spaced positions and on said structure, each roller being embraced by at least two of the belts, one of which also embraces a preceding roller and another of which also embraces a succeeding roller, said belts being of a construction such that as the rollers roll about the structure, successive portions of each belt come into contact with each of the rollers embraced thereby.

2. An assembly comprising a continuous series of spaced-apart and substantially parallel rollers, a plurality of continuous belts, each roller being embraced by a belt which also embraces a preceding roller and by another belt which embraces a succeeding roller of the series, and frame structure embraced by such series of belted rollers and about which said rollers are free to roll, said belts being of a construction such that as the rollers roll about the structure, successive portions of each belt come into contact with each of the rollers embraced thereby.

3. An assembly comprising a continuous series of spaced-apart and substantially parallel rollers, a plurality of continuous belt means for transmitting rolling motion of each roller to or from others, each roller being embraced by a plurality of the belt means, some of which also embrace the next preceding roller and others of which embrace the next succeeding roller of the series, and frame means having a continuous guideway thereabout and within which said series of rollers are retained by said belt means, the rollers being free to roll in such guideways.

4. A vehicle frame structure surrounded by a continuous track means, said track means comprising a series of spaced rollers free to roll upon and about said structure, the frame structure being formed with a guideway thereabout including guide portions limiting endwise movement of the rollers, belts for belting together each two adjacent rollers and acting to retain the rollers as a continuous series in the guideway and to transmit rolling motion of each roller to or from others.

5. An amphibious vehicle having a frame structure surrounded by a continuous track means, said track means comprising a series of spaced liquid-tight drums free to roll upon and about said structure and belts for transmitting rolling motion of each drum to or from a preceding drum and separately to or from a succeeding drum of the series, such belts also providing tread means for the vehicle.

6. In apparatus of the type described, the combination comprising frame structure having a guideway extending along its lower side for receiving roller track means, said guideway at one end of the structure curving upwardly and forwardly, thence rearwardly and then extending back along an upper portion of the structure, then curving downwardly and rearwardly, thence forwardly to merge into the guideway portion along the lower side of the structure, and roller track means in the form of a continuous series of belt-connected spaced-apart rollers in said guideway, the number and spacing of said rollers being such that as each roller rolls over the most forward curved portion of the guideway, the most rearward curved guideway portion will extend into a space between two adjacent rollers, whereby changes in the length of the belt connections required between rollers when passing over the forward curved guideway portions, will at least partially be compensated for by changes in the length of the belt connections required between rollers then passing over the rearward curved guideway portions.

7. The combination comprising a continuous series of parallel rollers in the form of liquid-tight drums spaced apart about a body structure and free to roll upon and around such structure, each drum being provided with a plurality of circumferential grooves, and belts running in such grooves, such belts connecting each drum to transmit rolling motion to or from a preceding drum and also separately to or from a succeeding drum of the series.

8. An assembly comprising a continuous series of spaced-apart and substantially parallel rollers, a plurality of continuous belts, each roller being embraced by a belt which also embraces a preceding roller and by another belt which embraces a succeeding roller of the series, such belts acting to transmit rolling motion of each roller to or from others, frame structure embraced by such series of belted rollers and about which said rollers are free to roll, a plurality of additional belts surrounding and embracing said series of rollers as a whole, and transverse cleats attached to said additional belts at spaced positions about the assembly.

9. An assembly in accordance with claim 2 and in which the rollers are in the form of inflatable drums.

10. A construction in accordance with claim 5 and in which the frame structure is flexible and resilient and has a guideway formed thereon for receiving the continuous track means.

11. A combination in accordance with claim 5 and in which the frame structure is in the form of an inflatable body having a guideway formed thereon for receiving the continuous track means.

(References on following page)

References Cited in the file of this patent

UNITED STATES PATENTS

| | | |
|---|---|---|
| 328,559 | Baker | Oct. 20, 1885 |
| 830,961 | Binford | Sept. 11, 1906 |
| 1,258,183 | Bucher | Mar. 5, 1918 |
| 1,822,132 | Davis | Sept. 8, 1931 |
| 1,839,766 | Le Tourneau | Jan. 5, 1932 |
| 2,426,342 | Couse | Aug. 26, 1947 |
| 2,442,334 | Bailey | June 1, 1948 |
| 2,463,121 | Sapp | Mar. 1, 1949 |
| 2,613,892 | Dever | Oct. 14, 1952 |

FOREIGN PATENTS

| | | |
|---|---|---|
| 32,510 | Switzerland | Dec. 2, 1904 |
| 510,965 | France | Sept. 16, 1920 |